United States Patent
Smith et al.

(10) Patent No.: US 10,159,010 B1
(45) Date of Patent: Dec. 18, 2018

(54) EXTENDING A QOS INDICATOR THROUGH WLAN TO AN ELECTRONIC DEVICE IN A HETEROGENEOUS NETWORK

(71) Applicant: Cisco Technology, Inc., San Jose, CA (US)

(72) Inventors: Malcolm Muir Smith, Richardson, TX (US); Mark Allen Webb, Troy, MI (US); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/792,535

(22) Filed: Oct. 24, 2017

(51) Int. Cl.
  *H04W 28/02* (2009.01)
  *H04W 28/24* (2009.01)
  *H04W 84/12* (2009.01)
  *H04L 12/851* (2013.01)

(52) U.S. Cl.
  CPC ....... *H04W 28/0268* (2013.01); *H04W 28/24* (2013.01); *H04L 47/24* (2013.01); *H04W 84/12* (2013.01)

(58) Field of Classification Search
  CPC .......... H04W 28/0268; H04W 28/24
  See application file for complete search history.

(56) References Cited

U.S. PATENT DOCUMENTS

| | | | |
|---|---|---|---|
| 7,817,611 B2 | 10/2010 | Ogura | |
| 2007/0297329 A1* | 12/2007 | Park | H04W 28/24 370/230.1 |
| 2008/0049695 A1* | 2/2008 | Ogura | H04L 47/2491 370/338 |
| 2015/0040121 A1* | 2/2015 | Barabash | G06F 9/45558 718/1 |
| 2016/0338073 A1 | 11/2016 | Nuggehalli et al. | |
| 2017/0055313 A1 | 2/2017 | Sharma et al. | |

FOREIGN PATENT DOCUMENTS

| | | |
|---|---|---|
| WO | 2016163808 A1 | 10/2016 |
| WO | 2017018970 A1 | 2/2017 |

* cited by examiner

*Primary Examiner* — Siming Liu
(74) *Attorney, Agent, or Firm* — Fernando & Partners, LLP; Ronald S. Fernando

(57) ABSTRACT

Various implementations disclosed herein include apparatuses, systems, and methods for extending a QoS indicator through WLAN to an electronic device in a heterogeneous network. The method comprises receiving, at a second wireless network, a packet from a first wireless network including a first quality of service (QoS) indicator for a first protocol of the first wireless network. The method further comprises determining a second quality of service (QoS) indicator for a second protocol of the second wireless network based on the first QoS indicator and network conditions of the second wireless network. The method further comprises transmitting the packet in accordance with the second QoS indicator.

20 Claims, 7 Drawing Sheets

US 10,159,010 B1

EXTENDING A QOS INDICATOR THROUGH WLAN TO AN ELECTRONIC DEVICE IN A HETEROGENEOUS NETWORK

TECHNICAL FIELD

The present disclosure relates generally to wireless networking, and in particular, translating a cellular quality-of-service indicator to a corresponding WLAN quality-of-service.

BACKGROUND

Networking use cases and/or business models are diverse and often have extensively defined network parameters. Accordingly, some cellular networks, including 5G networks, define slices that can be offered to users. Each slice is associated with qualitative and quantitative parameters. A particular use case and/or business model can employ an allocated slice, allowing for an ideal amount of network resources to be allocated to electronic devices associated with the use case and/or business model.

BRIEF DESCRIPTIONS OF THE DRAWINGS

For a better understanding of aspects of the various implementations described herein and to show more clearly how they may be carried into effect, reference is made, by way of example only, to the accompanying drawings.

Figure 1:
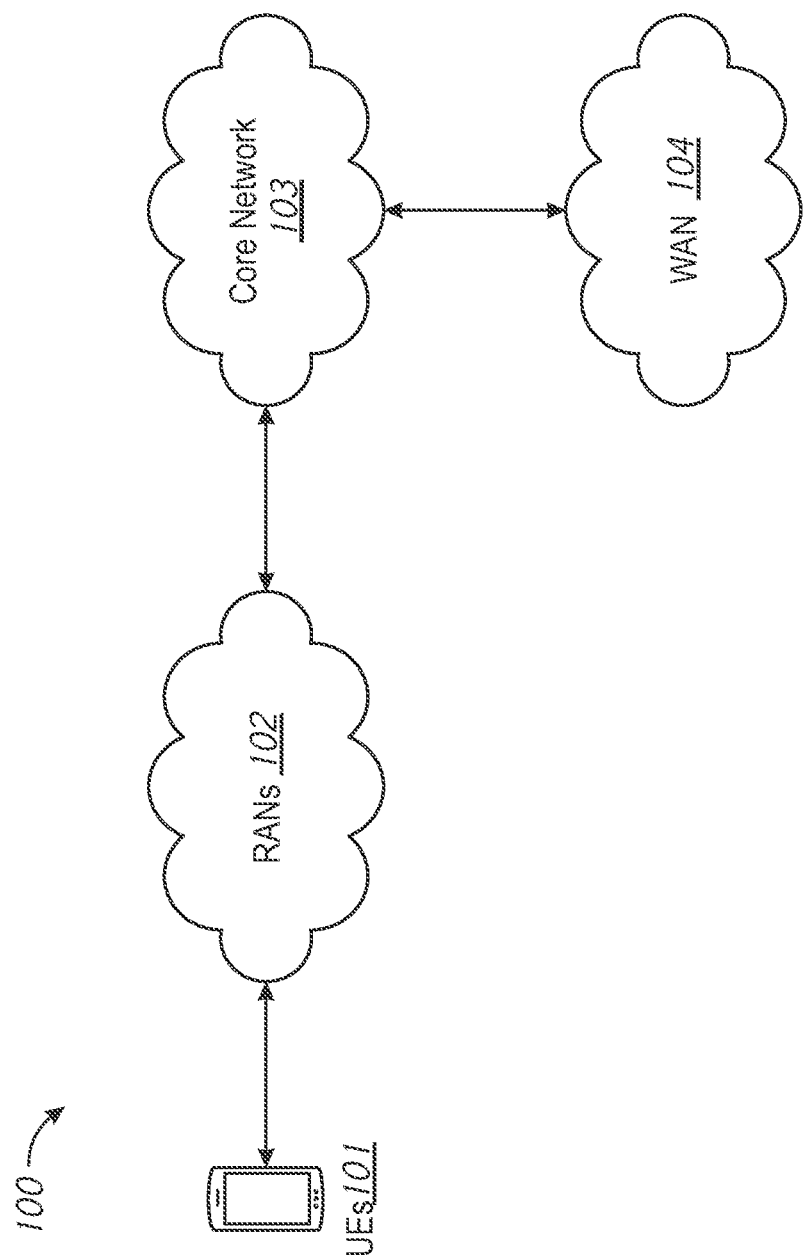
FIG. 1 is a simplified conceptual diagram of a networking slice.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for extending a quality of service (QoS) indicator through WLAN to an electronic device in a heterogeneous network. The method comprises receiving, at a second wireless network, a packet from a first wireless network including a first quality of service (QoS) indicator for a first protocol of the first wireless network. The method further comprises determining a second quality of service (QoS) indicator for a second protocol of the second wireless network based on the first QoS indicator and network conditions of the second wireless network. The method further comprises transmitting the packet in accordance with the second QoS indicator.

FIG. 1 is a conceptual diagram of a networking slice 100 (hereinafter "slice"). In various implementations, the slice can be defined by a 5G cellular network ("a 5G networking slice"). The slice supports one or more use case and/or business models. The networking slice 100 includes user devices 101 (e.g., cell phones, tablets, laptops, etc.) (hereinafter as singular "UE 101" or multiple "UEs 101"). Each UE of the UEs 101 is in wireless communication with one or more RAN (Radio Access Network) of RANs 102 (hereinafter as singular "RAN 102" or multiple "RANs 102"). It is to be appreciated that various networking slices can be tailored to various use cases and/or business models, and accordingly include electronic devices in addition to or different from the UEs 101 (e.g., virtual reality systems, autonomous vehicles, IoT devices, etc.).

In various implementations, the UE 101 has multiple wireless radios, enabling it to communicate with more than one RAN 102 implementing more than one RAT (radio access technology). This is often referred to as a "heterogeneous wireless network (HWN)" and/or "heterogeneous network (HetNet)." In various implementations, the UE 101 has a wireless radio capable of communication with a RAN 102 implementing a cellular RAT (e.g., 3G, 4G, LTE, 5G, etc.) (hereinafter "cellular network"), through a base station (e.g., gNodeB in 5G). In various implementations, the UE 101 has a wireless radio capable of communication with a RAN 102 implementing a wireless local area network (WLAN) (e.g., WiFi, WiMax, 802.11 compliant network, such as WiFi and/or WiMax) RAT, through an access point. Each RAT is tailored to the particular use case and/or business model associated with the slice 100. In various, implementations, the hardware, software, and/or cabling used to implement a RAT are tailored to the use case and/or business model.

The slice 100 includes a core network 103, or at least a portion thereof. In various implementations, the core network 103 includes a cellular core network (e.g., evolved packet core network in an LTE deployment). The core network 103 includes a network infrastructure that implements network functions tailored to the use case and/or business model associated with the slice 100. In various implementations, the network functions are virtualized. The network infrastructure includes a hardware, software, computing resources, storage, RF (radio frequency) units, and cables configured to support the use case and/or business model.

In various implementations, the use case includes but are not limited to, virtual reality (VR), augmented reality (AR), internet of things (IoT), autonomous driving, etc. For example, in various implementations, a networking slice could be associated with an autonomous vehicle use case.

In various implementations, the business model includes allowance of third parties (e.g., MVNOs (mobile virtual network operators) and verticals) to create their own network slices. In various implementations, the business model includes point-to-point personal communication. In various implementations, the business model includes best effort data services (e.g., web services). In various implementations, the business model includes network as a service, platform as a service, and/or infrastructure as a service. In various implementations, the business model includes big data and/or context awareness.

The networking slice 100 includes a WAN 104 (wide area network) that provides the UE 101 with connectivity to an external network (e.g., the Internet). In various implementations, the WAN 104 provides the core network 103 with a QoS indicator for a first protocol of the core network 103. In various implementations, the QoS indicator indicates a SLA (service legal agreement) requirement. In various implementations, the SLA parameter includes specifications of the slice 100 including but not limited to delay, jitter, bandwidth, PDU (packet data unit) characteristics, latency, and/or loss goals. In various implementations, the QoS indicator indicates a priority level associated with various classes of traffic. For example, in various implementations, the QoS indicator includes a quality of service class identifier (QCI) (e.g., 5G QCI).

Figure 2:
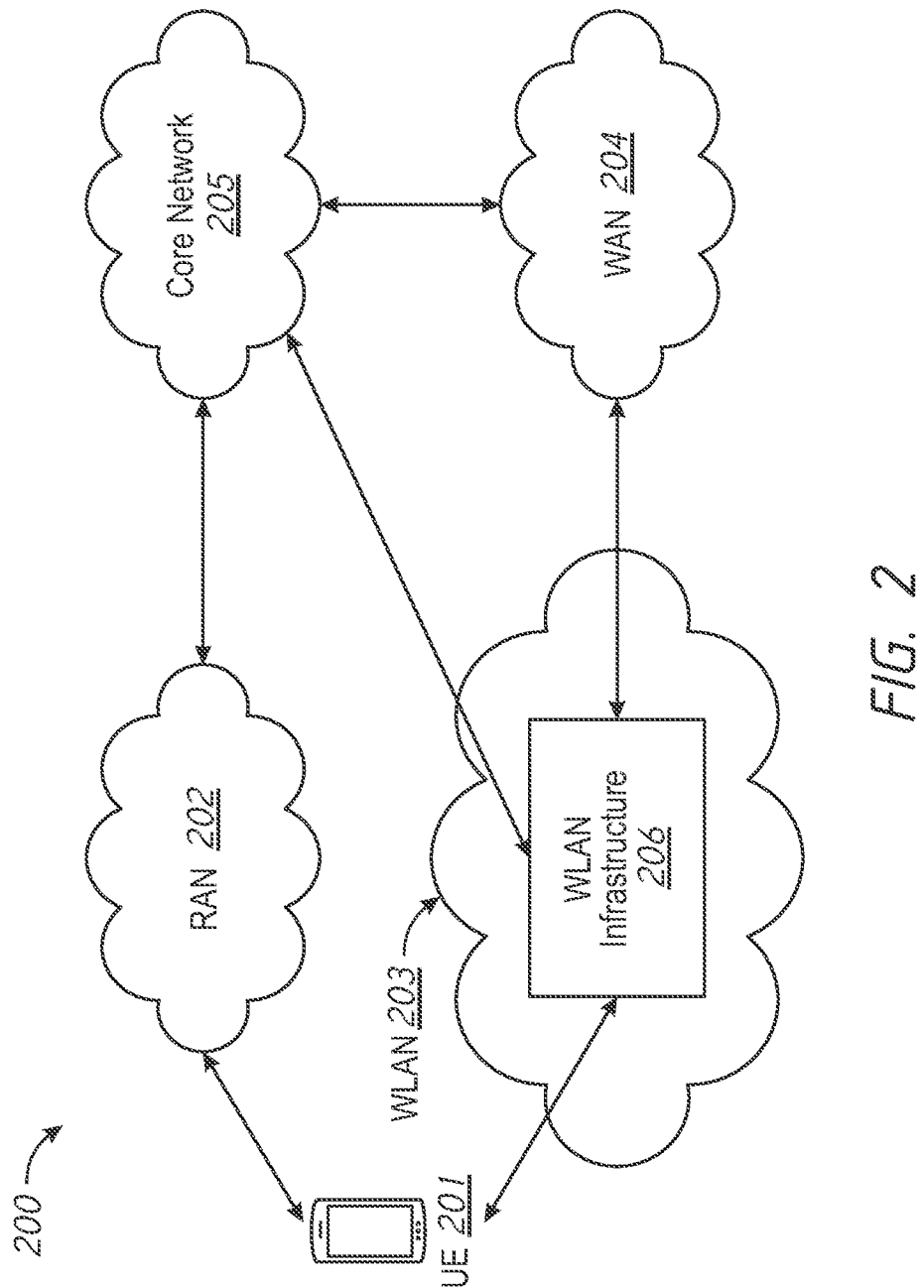
FIG. 2 is a block diagram of a heterogeneous wireless communication environment.

FIG. 2 is a block diagram of a heterogeneous wireless communication environment 200. The heterogeneous wireless communication environment 200 includes a UE 201 that is coupled to a RAN 202 and a WLAN 203, each of which provides the UE 201 with connectivity to a WAN 204 (e.g., an external network such as the Internet). Although only one UE 201 is depicted, it is to be appreciated that various heterogeneous wireless communication environment can include multiple UEs. Moreover, it is to be appreciated that various heterogeneous wireless communication environments can include electronic devices other than or in addition to the UEs (e.g., autonomous vehicles, IoT devices, etc.), wherein each of the various heterogeneous wireless communication environments defines one or more slice parameters tailored to the corresponding electronic devices.

In various implementations, all or portions of the RAN 202 are included at the RAN 102. The RAN 202 is coupled to a core network 205 that provides network functions to support a use case and/or business model. In various implementations, all or portions of the core network 205 are included at the core network 103.

In various implementations, the WLAN 203 implements a WLAN RAT. In various implementations, the WLAN RAT includes one or more licensed spectrums technologies (e.g., LTE-LAA (LTE License assisted access)). In various implementations, the WLAN RAT includes one or more unlicensed spectrums technologies (e.g., LTE-U (LTE unlicensed); 802.11 compliant deployments such as WiFi, MulteFire). In various implementations, the WLAN RAT includes a licensed spectrum and unlicensed spectrum technology.

The heterogeneous wireless communication environment 200 includes a WLAN infrastructure 206. The WLAN infrastructure 206 functions in part to provide the UE 201 with connectivity to the WAN 204. In various implementations, the WLAN infrastructure 206 or portions thereof obtains a first QoS indicator from the core network 205 and translates the first QoS indicator to a second QoS indicator. In various implementations, the first QoS indicator can include a SLA (service level agreement) specification of a core network (e.g., a 5G core network). For example, in various implementations, the SLA specification indicates a bandwidth, delay, jitter, PDU (packet data unit) characteristics, loss, and/or latency associated with different classes of traffic. In various implementations, the first QoS indicator can indicate a priority for various types of traffic. For example, in various implementations, the first QoS indicator includes a quality of service class identifier (QCI) (e.g., a 5G QCI).

Figure 3:
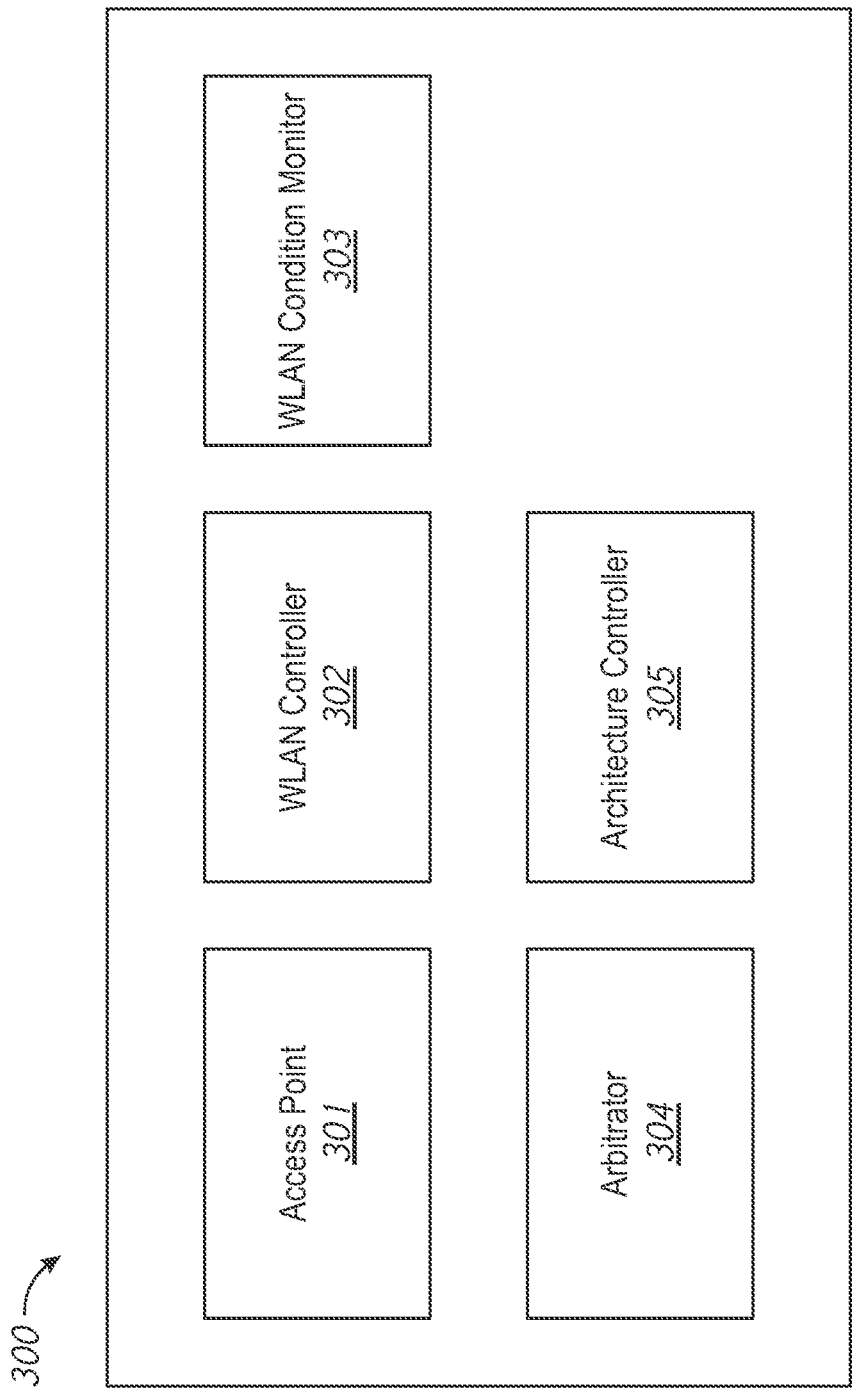
FIG. 3 is a conceptual diagram of a WLAN infrastructure.

FIG. 3 is a conceptual diagram of a WLAN infrastructure 300. In various implementations, all or a portion of WLAN infrastructure 300 are included in the WLAN infrastructure 206. The WLAN infrastructure 300 includes an access point 301. The access point functions to transmit packets to and receive packets from an electronic device (e.g., UE 201). The WLAN infrastructure 300 includes a WLAN controller (WLC) 302 that controls the access point and other features of the WLAN.

The WLAN infrastructure 300 includes a WLAN condition monitor 303. The WLAN condition monitor 303 measures conditions of the WLAN and provides the WLAN conditions and/or criteria based on the WLAN conditions to an arbitrator 304. In various implementations, the WLAN condition monitor 303 or portions thereof resides at the access point 301 and/or the WLC 302. In various implementations, the WLAN condition monitor 303 or portions thereof 303 are implemented at a programmable architecture application (e.g., Cisco DNA (digital network architecture) and/or Cisco SDA (software defined access)).

In various implementations, the WLAN condition monitor 303 includes functionality enabling it to detect applications running on an electronic device in communication with the WLAN. An example of an application detection system is a packet filtering mechanism is DPI (Deep Packet Inspection). An example application that uses DPI to identify applications at the WLAN is Cisco® NBAR2 (Network-Based Application Recognition Version 2).

The arbitrator 304 obtains a first QoS indicator and based on the WLAN conditions and the first QoS indicator, determines a second QoS indicator. In various implementations, the first QoS indicator is obtained via an ingress IP packet from the core network and may include one or more QoS indicators corresponding to one or more layers of the open systems interconnection (OSI) model and/or Internet protocol (IP) protocol stack. For example, the first QoS indicator may include a DSCP (Differentiated Services Code Point) value at layer 3 (e.g., IP) of the OSI model and/or a COS (class of service) value at layer 2 (e.g., Ethernet) of the OSI model. In various implementations, the second QoS indicator indicates whether and how to modify and/or remark the ingress IP packet. In various implementations, the second QoS indicator indicates how to transmit, via a layer 2 protocol, the ingress IP packet.

In various implementations, the WLAN condition module 303 and the arbitrator 304 reside in the same enclosure (e.g., co-located). In various implementations, the WLAN condition module 303 and the arbitrator 304 reside in separate enclosures (e.g., not co-located). The arbitrator 304 provides the second QoS indicator to an architecture controller 305.

In various implementations, the arbitrator 304 determines the second QoS indicator in accordance with a traffic-class marking scheme (e.g., DSCP (Differentiated Services Code Point) and/or COS (class of service), etc.). For example, in various implementations, the arbitrator 304 determines the second QoS indicator by employing access control lists (ACL), quality of service (QoS) parameters, and/or application detection modules (e.g., deep packet inspection).

The architecture controller 305 enforces policies on WLAN traffic destined to and received from one or more electronic devices (e.g., UEs, autonomous vehicles, IoT devices, etc.). In various implementations, the architecture controller 305 can obtain WLAN conditions from the WLAN condition monitor 303 to help facilitate the enforcement of policies. Additionally, the architecture controller 305 includes functionality to help facilitate the enforcement of policies. For example, in various implementations, the architecture controller 305 includes functionality enabling it to detect applications running on an electronic device at the WLAN. An example of an application detection system is a packet filtering mechanism is DPI (Deep Packet Inspection). An example application that uses DPI to identify applications at the WLAN is Cisco® NBAR2 (Network-Based Application Recognition Version 2). In various implementations, application traffic flows are identified using access control lists (ACL) and/or quality of service (QoS) parameters.

In various implementations, the architecture controller 305 can include constructs to help enforce the policies, including virtual networks (e.g., Virtual LAN (VLAN), VxLAN (virtual extensible LAN) and/or SGT (security group tags)), access-groups, segmentation, and/or traffic-class marking (e.g., DSCP (Differentiated Services Code Point) and/or COS (class of service), etc.).

In various implementations, the architecture controller 305 or portions thereof are implemented at a programmable architecture application (e.g., Cisco DNA (digital network architecture) and/or Cisco SDA (software defined access)). In various implementations, the architecture controller 305 or portions thereof can be implemented on edge routing equipment compatible with 5G networks, including edge-routing enterprise-level routing equipment. In various implementations, the architecture controller 305 or portions thereof resides at the access point 301. In various implementations, the architecture controller 305 or portions thereof resides at the WLC 302.

In various implementations, the architecture controller 305 enforces a traffic priority policy on WLAN traffic destined for an electronic device based on priority of the traffic as indicated by the second QoS indicator. In various implementations, the second QoS indicator indicates a priority level associated with traffic of a certain use case (e.g., a virtual reality electronic device). For example, in various implementations, the priority level is indicated by a QCI (quality class identifier) from the core network. In various implementations, the architecture controller 305 can use the second QoS indicator and WLAN conditions obtained from the WLAN condition module 303 to enforce a priority level of traffic towards an electronic device. For example, in various implementations, if the QoS indicates high priority traffic (e.g., a high priority use case, such as autonomous driving), then the architecture controller 305 can assign a high amount of WLAN bandwidth for traffic towards the electronic device. In another example, in various implementations, the architecture controller 305 can steer traffic between the WLAN link and cellular link (e.g., 5G link) based on utilizations of the links and based on the QoS associated with the traffic.

In various implementations, the architecture controller 305 enforces a traffic policy on WLAN traffic destined for an electronic device based on a SLA (service level agreement) specification as indicated by the second QoS indicator. In various implementations, the architecture controller 305 allocates a bandwidth level to WLAN traffic based on use case associated with the traffic. For example, in various implementations, traffic associated with a resource intensive application, such as a virtual reality, can be allocated a relatively high bandwidth level.

In various implementations, the architecture controller 305 or portions thereof and the arbitrator 304 reside in the same enclosure (e.g., co-located). In various implementations, the architecture controller 305 and the arbitrator 304 reside in separate enclosures (e.g., not co-located).

Figure 4:
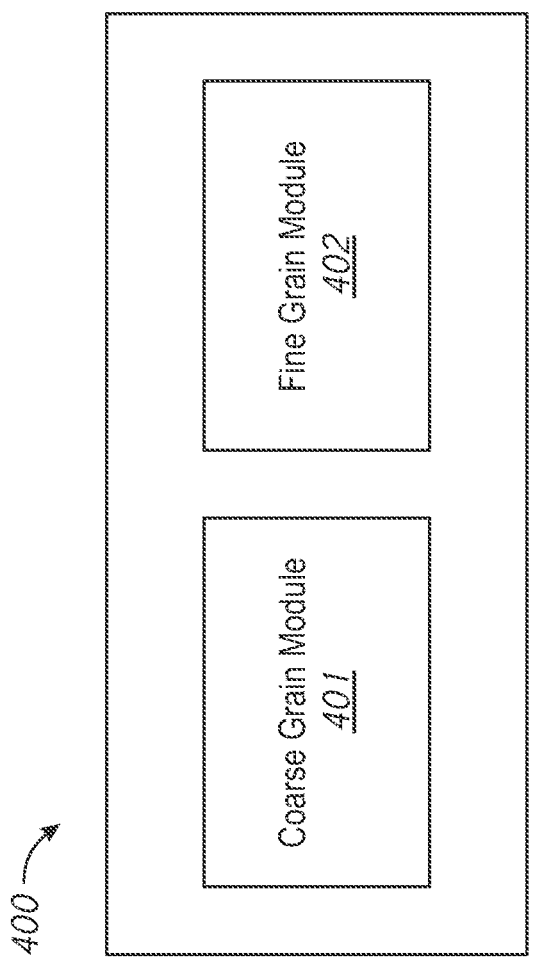
FIG. 4 is a conceptual diagram of an arbitrator.

FIG. 4 is a conceptual diagram of an arbitrator 400. The arbitrator 400 determines a second QoS indicator based on a first QoS indicator and conditions of a WLAN. In various implementations, all or a portion of the arbitrator 400 resides at the arbitrator 304.

The arbitrator 400 includes a coarse grain module 401. The coarse grain module obtains a coarse parameter of the first QoS indicator that includes coarse specifications of the core network (e.g., core network 205). In various implementations, the coarse parameter includes layer two specifications. For example, in various implementations, the coarse parameter includes at least one of bandwidth, loss, and latency specifications.

The arbitrator 400 includes a fine grain module 402. The fine grain module obtains a fine parameter of the first QoS indicator that includes fine specifications of the core network. In various implementations, the fine parameter includes layer two and/or layer three specifications. For example, in various implementations, the fine parameter includes loss and/or latency specifications.

In various implementations, the coarse grain module 401 and the fine grain module 402 each compares the WLAN conditions to the coarse parameter and the fine parameter, respectively. The results of the comparisons indicate whether the coarse parameter and the fine parameter are translated to a second QoS indicator.

In various implementations, the arbitrator 400 or portions thereof are implemented by an infrastructure controller. In various implementations, the infrastructure controller functions to allow WLAN applications to define the WLAN infrastructure (e.g., WLAN infrastructure 206) by enabling the applications to directly connect with a shared resource pool that includes network, compute, and storage capabilities. For example, in various implementations, the infrastructure controller can be a Cisco application policy infrastructure controller (APIC) and/or Cisco application policy infrastructure controller enterprise module (APIC-EM).

Figure 5:
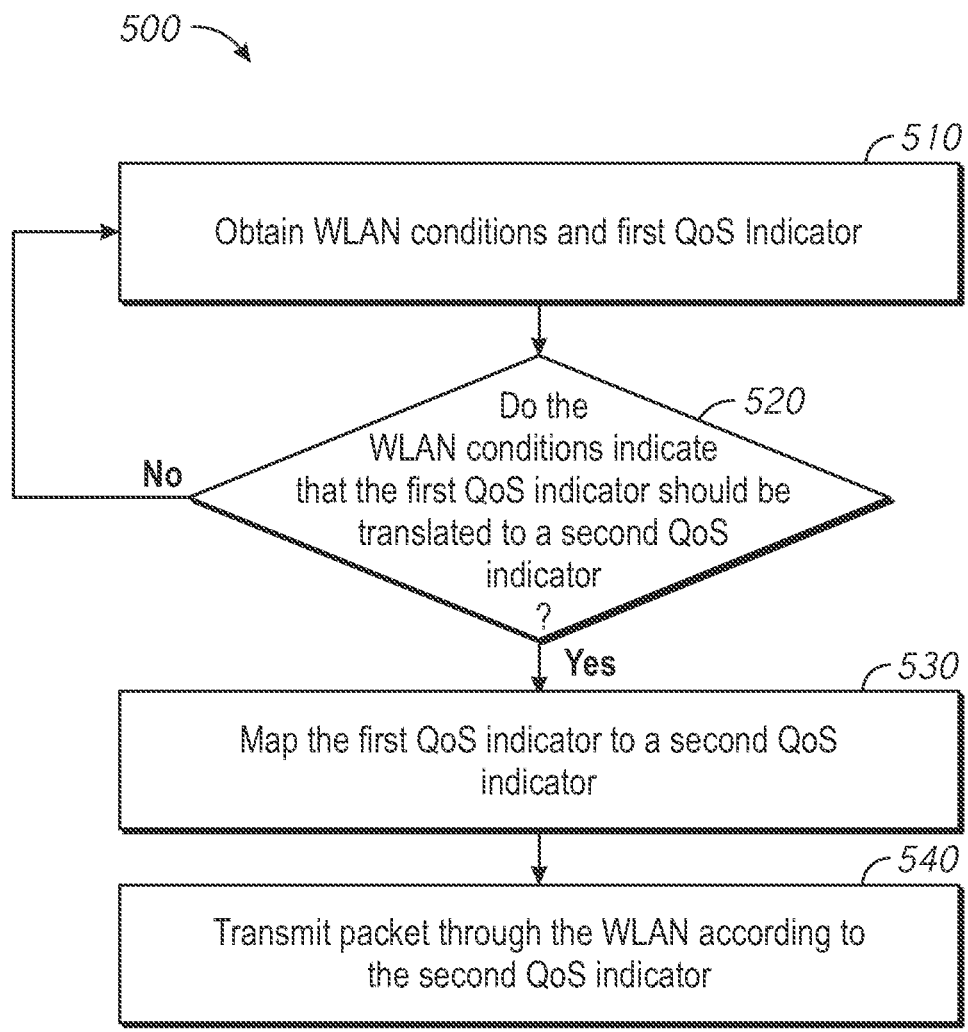
FIG. 5 depicts a method of determining a QoS indicator.

FIG. 5 depicts a method 500 of determining a QoS indicator. In various implementations, the method 500 or portions thereof are implemented at an arbitrator (e.g., the arbitrator 400).

At step 510, the arbitrator obtains WLAN conditions from a WLAN condition monitor (e.g., WLAN condition monitor 303) and a first QoS indicator from a core network (e.g. core network 205). In various implementations, the first QoS indicator includes a coarse parameter and a fine parameter that include coarse specifications and fine specifications associated with the core network, respectively.

At step 520, the arbitrator determines whether the WLAN conditions indicate that the coarse parameter and/or fine parameter should be translated to a second QoS indicator. If the determination is "no," then the method goes back to step 510. If the determination is "yes," then the method continues to step 530.

In various implementations, the WLAN conditions include conditions of the wireless portion of the WLAN and/or conditions of a corresponding wired network. The WLAN conditions associated with wireless portions of the WLAN include channel utilization, measured retry rate for an electronic device, SSID (service set identifier) of the electronic device, radio attributes, etc. The WLAN conditions associated with the wired portions of the WLAN include queue depths, drops, latency, jitter, etc. In various implementations, the WLAN conditions include thresholds and/or criteria based on the measured conditions.

Based on the thresholds and/or criteria, the arbitrator, at step 520, compares the WLAN conditions with the coarse parameter and/or fine parameter. For example, in various implementations, the arbitrator determines that a coarse parameter indicating a bandwidth class of 10 Mb/s should be translated and applied to WLAN traffic ("yes" determination→step 530) after determining that a corresponding WLAN condition indicates that the WLAN supports or can be configured to support a 10 Mb/s bandwidth level. In another example, in various implementations, the arbitrator determines that a fine parameter indicating a loss value of 0.1-1% should NOT be translated ("no" determination-→step 510) after determining that a corresponding WLAN condition indicates that the WLAN loss rate exceeds 0.1-1%.

In various implementations, the WLAN conditions include a use case and/or business model of an electronic device(s) at the WLAN. The arbitrator, at step 520, compares the use case and/or business model with the coarse parameter and/or fine parameter. For example, in various implementations, the arbitrator determines that a coarse parameter indicating a bandwidth class of less than 1 Mb/s should NOT be translated ("no" determination→step 510) after determining that an electronic device in the WLAN is associated with a use case using a high bandwidth (e.g., autonomous vehicle), e.g. one greater than 1 Mb/s. In another example, in various implementations, the arbitrator determines that a fine parameter indicating a latency class of less than 1 ms should be translated and applied to WLAN traffic ("yes" determination→step 530) after determining that an electronic device in the WLAN is associated with a business model specifying a latency less than 10 ms.

At step 530, the coarse parameter and/or fine parameter are translated to a second QoS indicator. In various implementations, the translation is based on a use case and/or business model of electronic devices at the WLAN. In various implementations, the translation is based on one or more configuration settings of the WLAN. For example, in various implementations, the configuration setting indicates WLAN user profiles. For example, in various implementations, the configuration setting indicates WLAN user categories (e.g., guest, accounting, etc.).

With respect to the coarse grain translation, a coarse grain module (e.g., the coarse grain module 402), at step 530, determines a second QoS indicator based on one or more of the configuration settings of the WLAN and/or the coarse parameter. In some implementations, the configuration settings are indicated by a virtual LAN (VLAN) tag. In various implementations, bandwidth classes are mapped to the second QoS indicator. For example, in some implementations, the coarse parameter indicates three bandwidth classes (e.g., less than 1 Mb/s, 1 Mb/s-10 Mb/s, and greater than 10 Mb/s), and the arbitrator maps these classes to corresponding user categories (e.g., guest user, accounting, and resource-intensive video editor). As another example, in some implementations, the second QoS indicator indicates that traffic associated with various use cases are allocated bandwidth levels based on the bandwidth specifications of the use cases.

With respect to the fine grain WLAN translation, a fine grain module (e.g., the fine grain module 403), at step 530, determines a second QoS indicator based on one or more of the configuration settings of the WLAN and/or the fine parameter. In some implementations, the configuration settings are indicated by a decorator (e.g., 802.1p, DSCP (Differentiated Services Code Point), and/or COS (class of service), etc.). In various implementations, loss classes and/or latency classes are translated to corresponding use cases and/or business models of electronic devices at the WLAN. For example, in some implementations, the fine parameter indicates three latency classes (e.g., less than 1 ms, 1 ms-5 ms, and greater than 5 ms), and the arbitrator translates these classes to corresponding user profiles at electronic devices (e.g., high priority user, medium priority user, and low priority user). For example, in some implementations, the fine parameter indicates three loss classes (e.g., less than 0.1%, 0.1%-1%, and greater than 1%), and the arbitrator translates these classes to use cases having corresponding loss requirements (e.g., autonomous vehicles, real-time video communication; and email).

At step 540, a packet is transmitted through the WLAN according to the second QoS indicator. In various implementations, the packet is transmitted through WLAN resources including WLC, access points and/or electronic devices. In various implementations, the WLAN resource(s) enforces a policy based on the second QoS indicator. For example, in various implementations, the policy is enforced by an architecture controller (e.g., the architecture controller 305).

In various implementations, a profile scheduler (e.g., airtime fairness scheduler (ATF)) schedules transmission of the packet according to the second QoS indicator. The profile scheduler can include a mapping of profiles of a use case and/or business models of an electronic device to corresponding airtime access requirements of the use case and/or business model. In various implementations, the bandwidth classes included in the coarse parameter are extended by lower-bounding the bandwidth classes and updating the profiles as WLAN conditions change. For example, the arbitrator can extend a high-bandwidth (e.g., greater than 10 Mb/s) component of the coarse parameter to an electronic device having a high priority on the profile scheduler (e.g., an autonomous vehicle). In this way, a high-priority use case electronic device receives a correspondingly high-bandwidth allocation. The profile scheduler can be static or dynamic (e.g., changing as priority of certain use cases and/or business models change). In various implementations, a profile of an electronic device can be identified by an SSID (service set identifier) of the electronic device.

In various implementations, the packet is transmitted according to the second QoS indicator based on a priority class of the packet. For example, in various implementations, traffic priority classes include access categories (AC) of a WiFi Multimedia (WMM) specification. In various implementations, expected access delay, and/or loss metrics based on WMM parameters (e.g., CW (contention window), AIFSN (Arbitrary Inter-Frame Space Number), TXOP (transmission opportunity), etc.) can be used to transmit the packet according to the second QoS indicator. In various implementations, the metrics can be predetermined, for example, by simulation. For example, a simulation can reveal that when the WLAN link utilization is between 25%-40%, a AC-VI priority class is sufficient for a use case requiring less than a 5 ms delay and a 2% loss. Continuing with the example, the simulation can also reveal that traffic associated with the same use case requires an AC-VO priority class when WLAN link utilization exceeds 40%.

Figure 6:
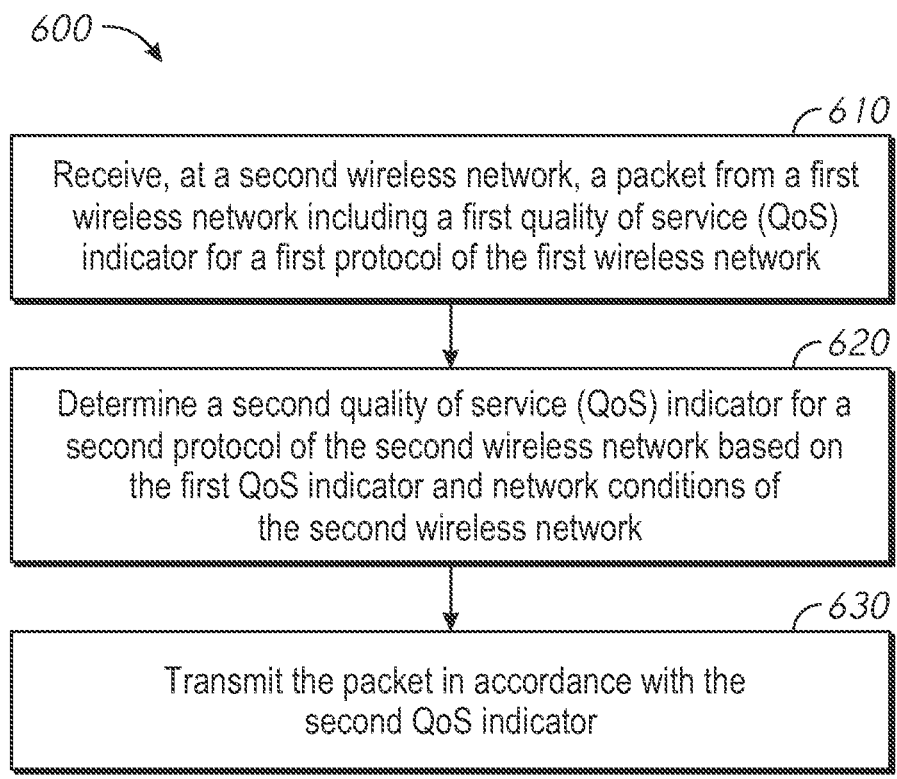
FIG. 6 is a flowchart representation of a method of determining a QoS indicator in accordance with some implementations.

FIG. 6 is a flowchart representation of a method 600 of determining a QoS indicator in accordance with some implementations. The method comprises, at step 610, receiving, at a second wireless network, a packet from a first wireless network including a first quality of service (QoS) indicator for a first protocol of the first wireless network. In various implementations, the first QoS indicator is associated with SLA and/or traffic priority levels associated with a core network. In various implementations, the first QoS indicator is associated with a use case and/or business model. In various implementations, the second wireless network includes a wireless local area network (WLAN)—e.g., 802.11 compliant standards including WiFi, high-efficiency WiFi, etc.

The method 600 further comprises determining, at step 620, a second quality of service (QoS) indicator for a second protocol of the second wireless network based on the first QoS indicator and network conditions of the second wireless network. In various implementations, the second QoS indicator includes a coarse parameter and a fine parameter. In various implementations, the coarse parameter indicates a bandwidth specification. In various implementations, the fine parameter indicates a loss and/or latency specification. In various implementations, the conditions of the second wireless network include criteria and/or threshold associated with measured conditions of the second wireless network. In various implementations, the second QoS indicator is determined in accordance with a determination of satisfaction of the criteria and/or threshold. In various implementations, determining the second QoS indicator is based on configuration settings of the second wireless network.

The method 600 further comprises transmitting, at step 630, the packet in accordance with the second QoS indicator. In various implementations, transmitting the packet in accordance with the second QoS indicator includes enforcing a policy on WLAN traffic destined for an electronic device.

Figure 7:
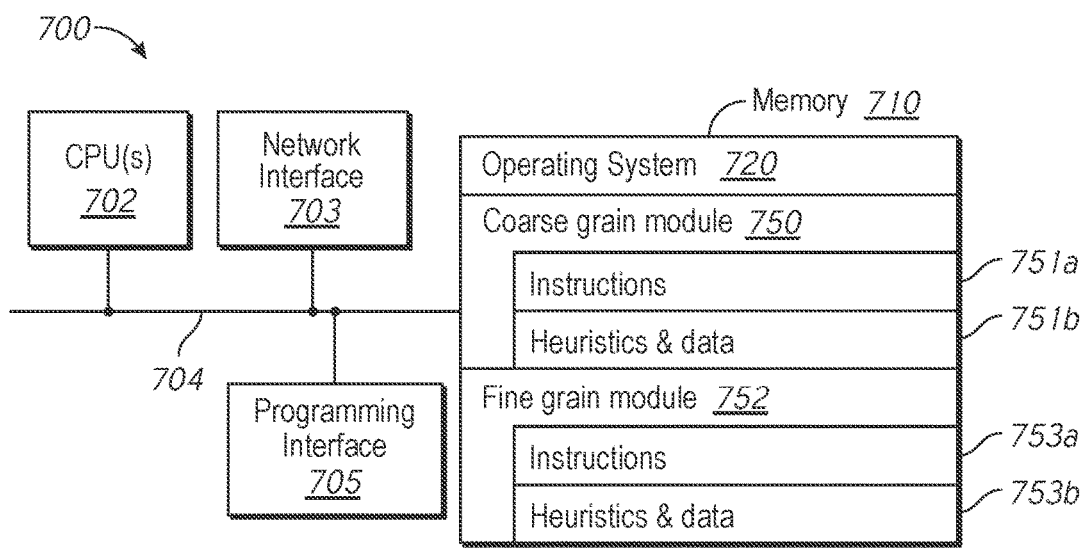
FIG. 7 is a block diagram of an example of a networking device in accordance with some implementations.

FIG. 7 is a block diagram of an example of a networking device 700 in accordance with some implementations. For example, in some implementations, the networking device 700 is similar to and adapted from the arbitrator 400 in FIG. 4. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the networking device 700 includes one or more processing units (CPU's) 702, a network interface 703, a memory 710, a programming (I/O) interface 705, and one or more communication buses 704 for interconnecting these and various other components. In some implementations, the one or more communication buses 704 include circuitry that interconnects and controls communications between system components.

The memory 710 includes high-speed random access memory, such as DRAM, SRAM, DDR RAM, or other random access solid state memory devices. In some implementations, the memory 710 includes non-volatile memory, such as one or more magnetic disk storage devices, optical disk storage devices, flash memory devices, or other non-volatile solid state storage devices. The memory 710 optionally includes one or more storage devices remotely located from the one or more CPUs 702. The memory 710 comprises a non-transitory computer readable storage medium. In some implementations, the memory 710 or the non-transitory computer readable storage medium of the memory 710 stores the following programs, modules and data structures, or a subset thereof including an optional operating system 720, a coarse grain module 750, and a fine grain module 752.

The operating system 720 includes procedures for handling various basic system services and for performing hardware dependent tasks.

The coarse grain module 750 is configured to determine a second QoS indicator based on a coarse parameter of a core network and WLAN conditions. To that end, in various implementations, the coarse grain module 750 includes instructions and/or logic 751a, and heuristics and data 751b.

The fine grain module 752 is configured to determine a second QoS indicator based on a fine parameter of the core network and the WLAN conditions. To that end, in various implementations, the fine grain module 752 includes instructions and/or logic 753a, and heuristics and data 753b.

FIG. 7 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first wireless network could be termed a second wireless network, and, similarly, a second wireless network could be termed a first wireless network, which changing the meaning of the description, so long as all occurrences of the "first wireless network" are renamed consistently and all occurrences of the "second wireless network" are renamed consistently. The first wireless network and the second wireless network are both wireless networks, but they are not the same wireless network.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   receiving, at a second wireless network, a packet from a first wireless network including a first quality of service (QoS) indicator for a first protocol of the first wireless network, wherein the first QoS indicator indicates a traffic requirement for the packet;
   determining a second quality of service (QoS) indicator for a second protocol of the second wireless network based on the first QoS indicator and network conditions of the second wireless network, wherein the second QoS indicator is determined as a first value sufficient to meet the traffic requirement when the network conditions include a first traffic condition and the second QoS indicator is determined as a second value sufficient to meet the traffic requirement when the network conditions include a second traffic condition; and
   transmitting the packet in accordance with the second QoS indicator in order to meet the traffic requirement.

2. The method of claim 1, wherein a profile scheduler schedules transmitting the packet in accordance with the second QoS indicator.

3. The method of claim 1, wherein the first wireless network includes a core cellular network.

4. The method of claim 1, wherein the first QoS indicator indicates a use case and/or business model associated with the first wireless network.

5. The method of claim 1, wherein the first QoS indicator indicates a service level agreement (SLA) value associated with the first wireless network.

6. The method of claim 5, wherein the SLA value includes at least one of a bandwidth level, loss level and/or latency level.

7. The method of claim 1, wherein the first QoS indicator indicates a quality of service class identifier (QcI) value associated with the first wireless network.

8. The method of claim 1, wherein the second QoS indicator includes a coarse parameter and a fine parameter.

9. A system comprising:
   an arbitrator configured to:
   receive, at a second wireless network, a packet from a first wireless network including a first quality of service (QoS) indicator for a first protocol of the first wireless network, wherein the first QoS indicator indicates a traffic requirement for the packet;
   determine a second quality of service (QoS) indicator for a second protocol of the second wireless network based on the first QoS indicator and network conditions of the second wireless network, wherein the second QoS indicator is determined as a first value sufficient to meet the traffic requirement when the network conditions include a first traffic condition and the second QoS indicator is determined as a second value sufficient to meet the traffic requirement when the network conditions include a second traffic condition; and
   transmit the packet in accordance with the second QoS indicator in order to meet the traffic requirement.

10. The system of claim 9, wherein the arbitrator includes a profile scheduler configured to transmit the packet in accordance with the second QoS indicator.

11. The system of claim 9, wherein the first QoS indicator indicates a use case and/or business model associated with the first wireless network.

12. The system of claim 9, wherein the first QoS indicator indicates a service level agreement (SLA) value associated with the first wireless network.

13. The system of claim 9, wherein the first QoS indicator indicates a quality of service class identifier (QcI) value associated with the first wireless network.

14. The system of claim 9, wherein the second QoS indicator includes a coarse parameter and a fine parameter.

15. A non-transitory memory storing one or more programs, the one or more programs comprising instructions, which, when executed by one or more processors of a networking device, cause the networking device to:
   receive, at a second wireless network, a packet from a first wireless network including a first quality of service (QoS) indicator for a first protocol of the first wireless network wherein the first QoS indicator indicates a traffic requirement for the packet;
   determine a second quality of service (QoS) indicator for a second protocol of the second wireless network based on the first QoS indicator and network conditions of the second wireless network, wherein the second QoS indicator is determined as a first value sufficient to meet the traffic requirement when the network conditions include a first traffic condition and the second QoS indicator is determined as a second value sufficient to meet the traffic requirement when the network conditions include a second traffic condition; and
   transmit the packet in accordance with the second QoS indicator in order to meet the traffic requirement.

16. The non-transitory memory of claim 15, wherein the instructions cause the networking device to transmit the packet in accordance with the second QoS indicator based on profile scheduling.

17. The non-transitory memory of claim 15, wherein the first QoS indicator indicates a use case and/or business model associated with the first wireless network.

18. The non-transitory memory of claim 15, wherein the first QoS indicator indicates a service level agreement (SLA) value associated with the first wireless network.

19. The non-transitory memory of claim 15, wherein the first QoS indicator indicates a quality of service class identifier (QcI) value associated with the first wireless network.

20. The non-transitory memory of claim 15, wherein the second QoS indicator includes a coarse parameter and a fine parameter.

* * * * *